Patented Dec. 25, 1945

2,391,452

UNITED STATES PATENT OFFICE 2,391,452

1,3,5-TRIAZINYL-PHENYL-SULPHIDES CARRYING A METALLIC RADICAL

Ernst A. H. Friedheim, New York, N. Y.

No Drawing. Application October 1, 1942,
Serial No. 460,413

9 Claims. (Cl. 260—242)

This invention relates to therapeutically active, new, asymmetric triazinyl sulphides carrying an organometallic radical, and has particular relation to triazinyl sulphides in which the phenyl group carries an organometallic radical containing Sb, P, Hg or Se atom.

The compounds according to this invention correspond to the general formula

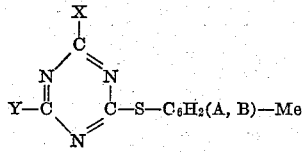

In this formula $C_6$ represents a benzene ring. X and Y may be equal or different and represent halogen or the residue of any inorganic or organic, aliphatic or cyclic, isocyclic or heterocyclic, monocyclic or polycyclic molecule containing an active hydrogen atom capable of reacting with a cyanuric halide with the formation of hydrogen halide. X and Y may be f. e. selected from a first group consisting of Cl, Br, I, F, H, —OH, —O—alkyl, —O—acyl, —NH$_2$, —NH—alkyl, —N—alkyl$_2$, —NH—acyl, —NH—NH$_2$, —NH—NH—alkyl, —N—alkyl—NH$_2$, —N—alkyl—NH—alkyl, —NH—NH—acyl, —N—acyl—NH$_2$, —Nacyl—NHacyl, —NH—aryl, NH—NH—aryl, —NH(CH$_2$)$_n$—CONH$_2$, —NH(CH$_2$)$_n$—NH$_2$, —NH(CH$_2$)$_n$—NHalkyl, —NH(CH$_2$)$_n$—N—dialkyl, —NH(CH$_2$)$_n$—OH, —NHCH$_2$CHOHCH$_2$OH, —NHOH,

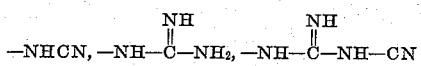

residues of cyanamide derivatives, residues of substituted guanidines, amino-derivatives of carbohydrates, particularly amino-derivatives of monosaccharides, such as glucose-amine, —SH, substituents of the type —S—R wherein R stands for any aliphatic or cyclic groups capable of carrying a —SH group, such thioglycolic acid and thiophenol, alkyl radicals and their substitution products, and isocyclic or heterocyclic hydrocarbon radicals, which may be monocyclic or polycyclic, and their substitution products, such as O—aryl groups, substituted-aryl radicals, such as those corresponding to the formula

—NH—C$_6$H$_2$(A,B)—E
—NH—NH—C$_6$H$_2$(A,B)—E wherein A and B may represent equal or different substituents defined further below, and E may be in ortho-, meta- or para-position with respect to the —NH— or —NH—NH— group and may f. e. represent a radical selected from the group consisting of —SO$_3$H, —SO$_2$NH$_2$, COOH, and metallic radicals, such as —SbO$_3$H$_2$, —PO$_3$H$_2$, —SeO$_3$H$_2$, —AsO$_3$H$_2$, —AsO, and —HG—radicals. X and/or Y may also stand for substituted sulphur-aryl radicals of the formula —S—C$_6$H$_2$(A,B)—Me
—S—C$_6$H$_2$(A,B)—As—$^{III}$
—S—C$_6$H$_2$(A,B)—As—$^{V}$ or for 1,3,5-triazine groups or residues of triazine derivatives, and said radicals and triazine groups or derivatives may be linked directly or indirectly to the ring carbon atoms of the first triazine ring. In the latter case, the link between the above mentioned —S—aryl—Me radical and the triazine ring carbon may be formed by a cyclic or aliphatic amine radical, f. e. by an —NH—aryl, —NH—alkyl, —NH—NH—aryl, or —NH—NH—alkyl radical. The link between the first and the substituting triazine ring may be formed by an —NH, —NH—NH— group or an aliphatic or cyclic diamine, f. e. of the formula

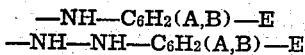

or

—NH—CH$_2$—CH$_2$—NH—

The radicals A and B may be the same or different and preferably selected from the group consisting of H, —OH, —O—alkyl, —O—acyl, —NO$_2$, —NH$_2$, —NH—NH$_2$, —NH—acyl, —NH—alkyl, —N—alkyl$_2$, alkyl and halogen.

Me may be in ortho-, meta- or para-position with respect to S, and represents a metallic radical selected from the group consisting of —SbO$_3$H$_2$, —PO$_3$H$_2$, —Hg—halogen, —HgO—acyl and SeO$_3$H$_2$.

It is to be understood that in the appended claims the term "amino radicals" is used to include —NH$_2$ radicals as well as the above disclosed substituted amino radicals.

It has been found that compounds embodying the present invention may be prepared by reacting a triazine derivative carrying at least one sulphhydril group or a tautomeric structure, with organometallic derivatives or diazobenzene according to the following reaction:

Triazine—SH+N$_2$—aryl—Me→
    Triazine—S—N=N—aryl—Me→
→Triazine—S—aryl—Me+N$_2$ The sulphur containing triazine derivatives used for preparing the compounds according to this invention may be prepared according to known methods by reacting a triazine derivative containing at least one halogen linked to a triazine ring carbon, with alkali sulphide or sulphhydrate. The second and third ring carbon atom in said triazine derivative may carry identical or different radicals, for example halogen atoms or —NH$_2$ radicals. This method allows for the ready preparation of a great variety of suitable thiotriazines. In certain cases it may be of advantage to prepare thiotriazines by direct ring formation, e. g. by reactions involving the cyan radical, such as dicyanamide, biguanide, thiocyanide.

Compounds embodying this invention may also be prepared from triazine —SH— compounds by reacting them with metal-free diazo-compounds carrying a substituent that can be replaced by a metal radical after the formation of a triazine phenylsulphide.

Furthermore mercury-containing compounds corresponding to this invention may also be prepared by replacing the arsenic radical in triazine-thiophenyl-arsenoxide by mercury. The preparation of triazine-thiophenyl-arsenoxide is described in my copending application filed on October 1, 1942.

*Example I.*—26.4 g. of stibanilic acid are dissolved in 100 cc. of a 2N solution of NaOH. 7 g. of sodium nitrite are added, and the solution is run in thin stream, with stirring and cooling, into a mixture of 37.5 cc. of HCl (D=1.19) and 250 g. of ice. The reaction mixture is allowed to stand for 30 minutes, and is then run, with rapid stirring into 600 cc. of an aqueous solution containing 17.2 g. of thioammeline and 33.4 g. of anhydrous sodium carbonate. Throughout this step, the temperature of the solution is maintained at about 70° C. Stirring is continued until the reaction mixture fails to give a color reaction with R-salt, e. g. for 1 hour. The reaction mixture is then boiled for 2 minutes with copper bronze, boneblacked and filtered. The filtrate is acidified with 5N HCl, using Congo red as an indicator. During this procedure a precipitate is formed and redissolved in an excess of hydrochloric acid. The acid solution is boneblacked and filtered, and yields on addition of sodium acetate up to a faintly blue coloration, a yellowish precipitate which is filtered off and washed with 20% acetic acid, water and alcohol. This crude diamino-triazine thiophenyl-stibinic acid is redissolved in 15 times its weight of water and the necessary amount of sodium bicarbonate to form a solution slightly alkaline to litmus. The alcaline solution is boneblacked and filtered, and yields on acidification with acetic acid a white precipitate which is filtered off, washed with water and recrystallized out of hot 20% acetic acid. The diamino-triazine-thiophenyl stibinic acid is soluble in aqueous bicarbonate of soda and in an excess of warm, dilute hydrochloric acid. It is insoluble in alcohol and ether. The solution in concentrated warm hydrochloric acid yields on cooling a crystalline chlorhydrate. The reaction takes place according to the scheme:

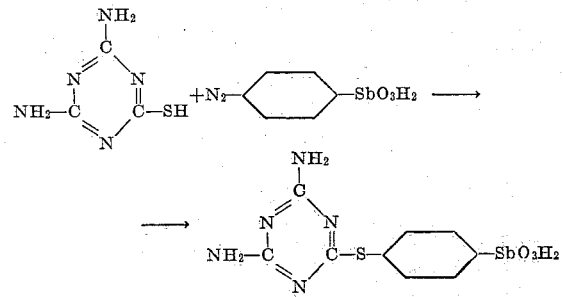

A trace of the substance fused with metallic sodium gives a deep purple tint on addition of an aqueous solution of nitroprussate.

The same procedure may be followed with a substituted stibanilic acid, such as nitrostibanilic acid and yields the corresponding diamino-triazine-thionitro-stibinic acid.

Diamino-triazine-thiophenyl phosphoric acid may be prepared in a procedure analogous to that hereinbefore described by using instead of stibanilic acid an equivalent amount of phosphanilic acid or a substituted phosphanilic acid.

*Example II.*—A solution of 240 g. of thiophenyl phosphoric acid

prepared by treating diazobenzene phosphoric acid with sodium xanthogenate) in 300 g. of N NaOH is run, drop by drop, with stirring and cooling into a suspension of cyanuric chloride in 200 cc. of water. Stirring is continued until the reaction mixture shows no color reaction with sodium nitroprussate, e. g. for about 2 hours. On acidification, a white precipitate of dichloro-triazine-thiobenzene-phosphoric acid is formed. The precipitate is filtered off and washed with dilute hydrochloric acid, water and acetone.

The compound is soluble in sodium carbonate solution, and in an excess of hydrochloric acid. It is insoluble in alcohol and ether. One or both of the halogens of the compound may be substituted by amino groups, by treatment with ammonia.

*Example III.*—Following the procedure outlined in Example I, p-diazonitrobenzene is reacted with thioammeline to form diaminotriazine-p-thio-nitrobenzene which is reduced in acetic acid solution with iron to form the diamino-triazine-p-thiophenylamine corresponding to the formula

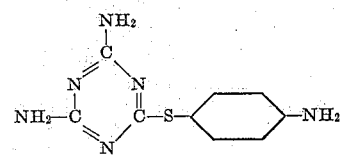

The latter is transformed in acid solution by treatment with sodium nitrite to the corresponding diazo-compound which, on treatment with SbCl₃ is converted into diamino-triazine-p-thiophenyl-stibinic acid.

The use of substituted diazonitrobenzene in the above procedure allows readily for the preparation of substituted stibinic acids.

*Example IV.*—35 g. of diamino-triazine-p-thiophenyl arsin oxide corresponding to the formula

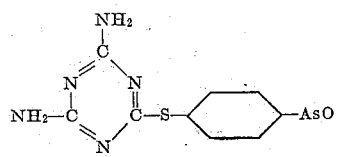

prepared as described in my copending application filed on October 1, 1942 is dissolved in 300 cc. of n/1 NaOH and stirred with 10.8 g. of mercuric oxide. A clear solution is formed, which, on standing, yields a white precipitate of diamino-triazine-p-thio-phenyl mercuric acid. The precipitate is filtered off and recrystallized out of hot acetic acid in form of the corresponding mercury acetate.

The use of diamino-p-thiophenyl arsin oxides, which are substituted in the benzene ring, allows readily for the preparation of correspondingly substituted mercury compounds.

*Example V.*—35 g. of p-aminophenyl mercuric acetate are added to 50 cc. of water. 20 cc. of glacial acetic acid are added, and the mixture is heated until a clear solution is obtained. The solution is cooled to 5° C. and diazotized with 7 g. of sodium nitrite dissolved in 30 cc. of water. The orange-brown diazo solution is filtered and run with rapid stirring into 300 g. of 2N NaOH containing 17 g. of thioammeline, and maintained at about 40° C. The reaction mixture, upon being acidified with chlorhydric acid, yields a precipitate. This precipitate is filtered off, washed with dilute hydrochloric acid and water and recrystallized out of hot acetic acid. The resulting product is diamino-triazine-p-thiophenyl mercuric acetate corresponding to the formula

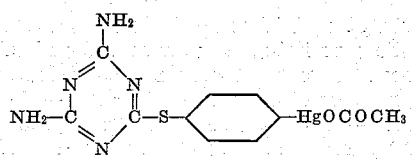

The substance is a white crystalline powder, soluble in hot acetic acid, and insoluble in cold water and ether.

*Example VI.*—28.8 g. of meta-aminophenyl selenic acid of the formula

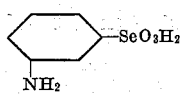

are dissolved in 250 cc. of $n/1$ HCl and diazotized by treatment with 69 g. of NaNO$_2$. The diazo solution is filtered and run with rapid stirring into 250 cc. of 2N NaOH solution containing 14.3 g. of thioammeline, maintained at about 50° C. Upon acidifying the reaction mixture with hydrochloric acid a precipitate is formed, which is filtered off, washed with dilute hydrochloric acid and recrystallized from hot water. The resulting product is a diamino-triazine-m-thiophenyl selenic acid of the formula

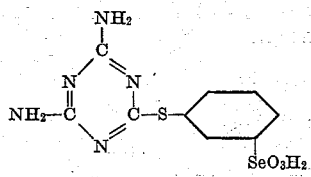

Further compounds embodying the present invention, in which X and/or Y stands for a radical other than those described in the above examples, may be obtained f. e. by first preparing an X—Y—triazine compound, in which at least one carbon atom of the triazine ring carries a halogen, and reacting such triazine compound with a suitable aromatic compound carrying a metallic radical, such as thiophenyl-phosphoric acid. Thiophenyl compounds carrying other Me radicals may be used instead of thiophenyl phosphoric acid. Or the X—Y—triazine—halogen derivative may be reacted with alkali sulphhydrate in order to form the corresponding X—Y—thiotriazine, and the latter is reacted with a diazobenzene derivative carrying an Me radical. These reactions between the X—Y—triazine—halogen compounds or the X—Y—triazine—SH compounds and the phenyl—Me derivatives may be carried out in a manner analogous to that described in the above examples.

Furthermore, triazine derivatives embodying the present invention may also be obtained by reacting a compound corresponding to the general formula

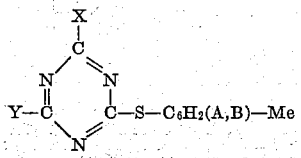

and containing as X and/or Y active groups f. e. halogens or —NH$_2$ groups, with any organic or inorganic compound capable of combining with or replacing X and/or Y. A compound of the formula

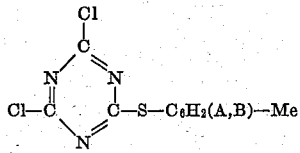

may be reacted, for example, with thiophenol arsonic acid or arsanilic acid in order to replace one or both Cl-atoms by the corresponding arsonic acid radical.

Compounds embodying this invention and carrying A,B substituents other than those described in the above examples, may be obtained by a procedure substantially analogous to the procedure described in said examples.

I have further found that by treating a compound corresponding to the general formula

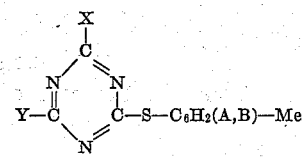

with mild oxidizing agents, such as diluted H$_2$O$_2$ or diluted nitric acid, the —S atom is converted into a —SO— or —SO$_2$— radical, thus forming a compound corresponding to one of the following formulas:

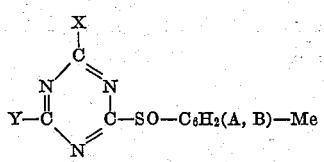

and

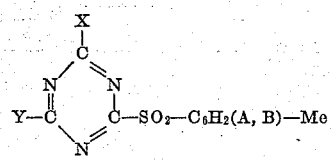

The new compounds are adapted to be used as medicinal preparations. They exert a therapeutic action in the infectious diseases, such as those caused by certain protozoa and certain spirochetes, and have a relatively low toxicity.

It will be understood that this invention may be carried out in other specific ways than those herein set forth, and the examples should be, therefore, considered as illustrative and not restrictive within the spirit of the invention as defined in the appended claims.

I claim:

1. A new compound corresponding to the general formula

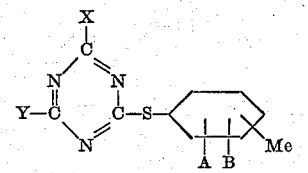

wherein X and Y are selected from the group consisting of halogens and amino radicals, A and B are selected from the group consisting of H, OH, and halogens, and Me represents a metallic radical selected from the group consisting of —SbO₃H₂, —PO₃H₂, Hg—halogen, HgO—acyl, and —SeO₃H₂ radicals.

2. A new triazine-sulphur-aryl compound of the formula

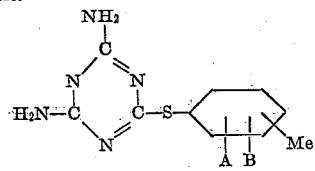

wherein A and B are selected from the group consisting of H, OH and halogen, and Me represents a metallic radical selected from the group consisting of —SbO₃H₂, —PO₃H₂, —Hg—halogen, —HgO—acyl and —SeO₃H₂.

3. A new triazine-sulphur-aryl-compound of the formula

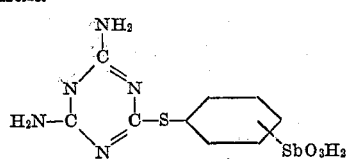

4. A new triazine-sulphur-aryl compound of the formula

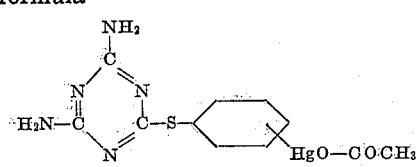

5. A new triazine-sulphur-aryl compound of the formula

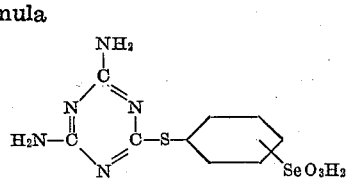

6. A process for the preparation of a compound of the formula

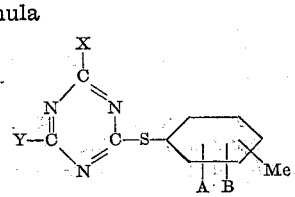

wherein X and Y are selected from the group consisting of halogens and amino radicals, A and B are selected from the group consisting of H, OH, and halogens, and Me represents a metallic radical selected from the group consisting of —SbO₃H₂, —PO₃H₂, —Hg—halogen, —HgO—acyl, and —SeO₃H₂ radicals, said process comprising mixing in aqueous reaction medium an organometallic compound of the formula

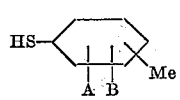

with an 1,3,5-triazine compound of the formula

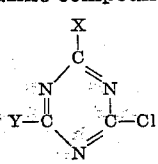

7. A process for the preparation of a compound of the formula

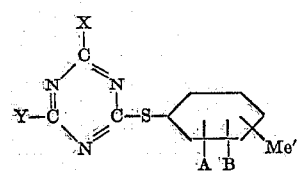

wherein X and Y are selected from the group consisting of halogens and amino-radicals, and Me' represents a metallic radical selected from the group consisting of —SbO₃H₂, —Hg—halogen, and —HgO—acyl radicals, said process comprising mixing in aqueous reaction medium a diazobenzene compound of the formula

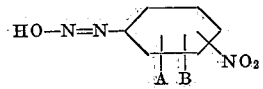

with a compound of the formula

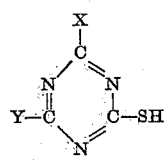

reducing the nitrogroup of the diazobenzene compound to an amine-group, diazotizing the amine-group, and mixing the diazotized compound with a metal compound selected from the group consisting of antimony salts and mercury salts.

8. A process for the preparation of a compound of the formula

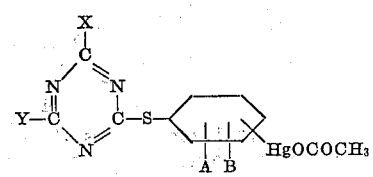

wherein X and Y are selected from the group consisting of halogens and amino-radicals, and A and B are selected from the group consisting of H, OH, and halogen, said process comprising mixing in aqueous solution a compound of the formula

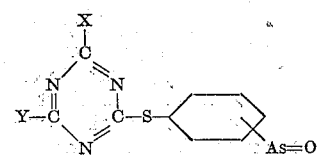

with mercuric acetate.

9. A process for the preparation of a compound of the formula

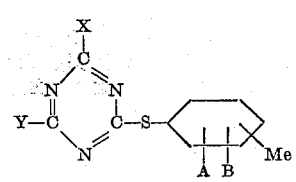

wherein X and Y are selected from the group consisting of halogens and amino-radicals, and A and B are selected from the group consisting of H, OH and halogen, said process comprising mixing in aqueous reaction medium a compound of the formula
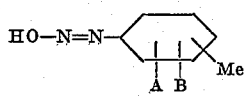
with a compound corresponding to the formula
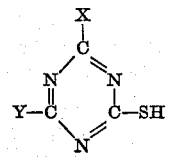
ERNST A. H. FRIEDHEIM.